Figures 1, 2:
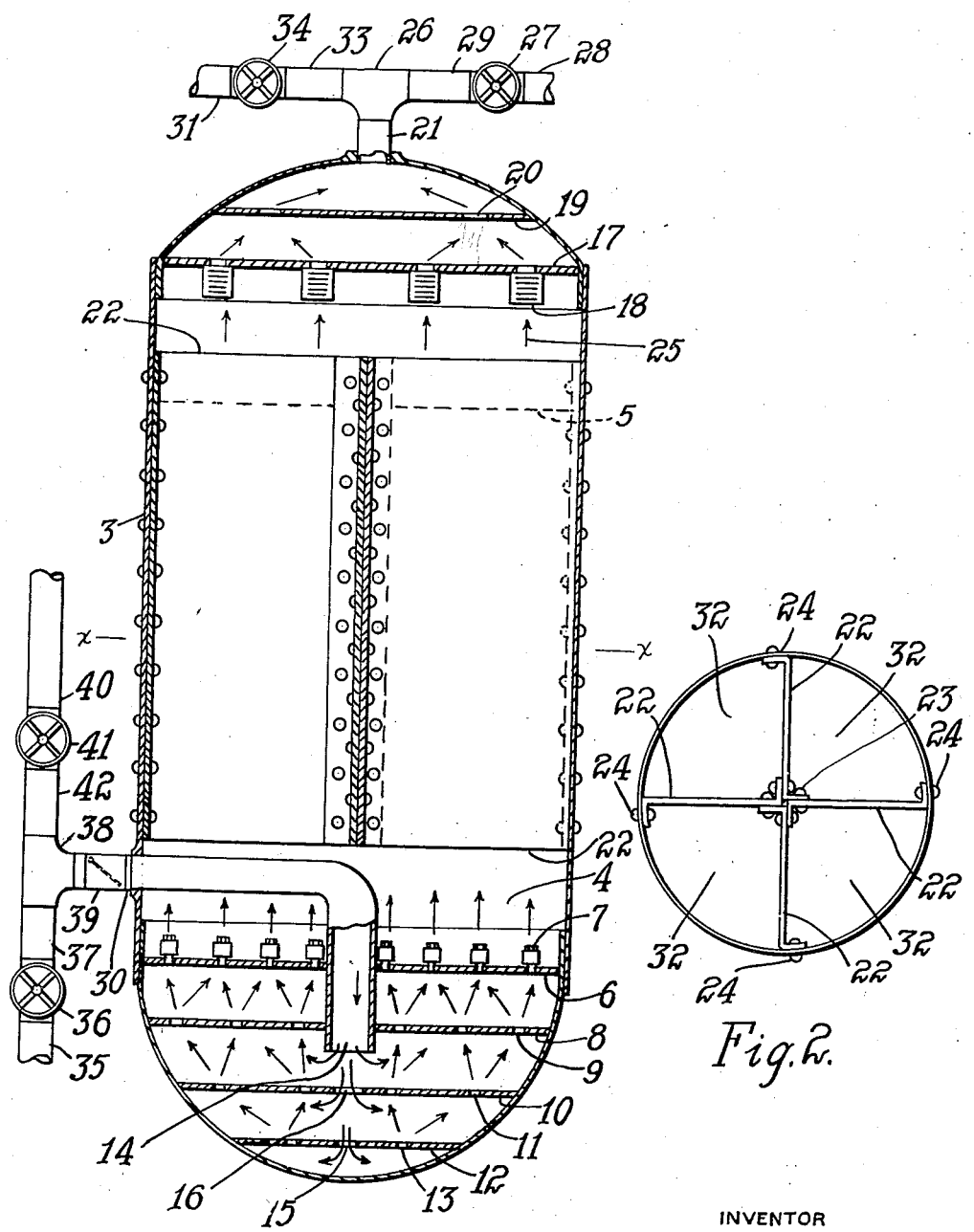

April 11, 1933.  A. J. DOTTERWEICH  1,903,613
WATER SOFTENING APPARATUS

Filed Nov. 6, 1929

INVENTOR
Andrew J. Dotterweich

Patented Apr. 11, 1933

1,903,613

UNITED STATES PATENT OFFICE

ANDREW J. DOTTERWEICH, OF PITTSBURGH, PENNSYLVANIA, ASSIGNOR TO AUTOMATIC WATER SOFTENER COMPANY, OF PITTSBURGH, PENNSYLVANIA, A CORPORATION OF DELAWARE

WATER SOFTENING APPARATUS

Application filed November 6, 1929. Serial No. 405,109.

This invention relates to a complete water softening apparatus of the type embodying a zeolite or base exchange material as a means to soften water and which is adapted to be regenerated at intervals.

It is among the objects of this invention to provide a means which will reduce the dilution action of water to a minimum when flushing a salt solution from a softener by controlling or confining the flow thru substantially fixed paths.

Another object of this invention is to provide a means whereby a minimum volume of water is required to upwardly flush out regenerating material from a bed of zeolite within a container of given volume.

Another object of this invention is to provide a series of baffle plates in close proximity to the inlet of the incoming fluid for purpose of reducing the kinetic energy or force therefrom to secure a more effective distribution of the fluid passing thru the zeolite bed.

These and other objects of the invention will become more apparent from consideration of the accompanying drawing in which like reference characters designate like parts and in which Fig. 1 is a sectional view of a water softening system embodying the principles of this invention and Fig. 2 is a section thru $x$—$x$ illustrating means providing for division of the sectional area of a container into a plurality of smaller areas.

For purpose of illustration, the invention is described as an upflow water softening system wherein softening, regenerating and flushing are all done in an upward direction.

Further for reason of an understanding of the principles involved in this invention, reference is made to the fact that in displacing one fluid in a container by another fluid so as to remove the first mentioned fluid from the container entirely, such second fluid inter-mingles with the first fluid whereby thru a process of dilution, the first fluid is removed and the second fluid takes its place.

This process of dilution requires that the volumetric space occupied by a fluid shall be displaced many times, before a complete change of fluids has taken place, particularly so if the flow of the incoming fluid is thru the container in an upward direction and the fluid being displaced has a greater specific gravity than the displacing fluid, such as is the case when fresh water is used for purpose of flushing out a regenerating solution from a water softening apparatus.

I have found such a process of dilution or change by displacement is most efficiently accomplished if means are provided to control the passage of fluids thru a container in a manner which will avoid disturbances of the fluids, such as a churning action.

Another consideration effecting this change of fluid by displacement is the force or kinetic energy of the water entering a container. If no means are provided to deaden or lessen the force of the incoming water, such incoming water when discharging directly into a body of water within a container, sets up cross currents or disturbances which retard the displacing action referred to in the above paragraphs.

It is obvious that for purpose of reducing the disturbances due to the kinetic force of an incoming water, the velocity of discharge into the container should be as low as is possible, preferably equal to or not much more than the velocity thru the container.

Such an arrangement is impractical for mechanical reasons and therefore as a substitute, provision is made by means of baffle plates placed in the path of flow of the incoming water which reduce the velocity or kinetic energy of the incoming water to values which have been found to be practical before such incoming water passes thru the strainer plate to the zeolite bed.

In practice at present, it is customary to provide a receiving chamber within the softener just below the strainer plate. If this space is too small, the force of the incoming water into the chamber causes unequal distributing of the fluid which passes from the chamber, due to the force of the flow exerting a greater pressure against some strainer nozzles in one section of the strainer plate than in other sections with the result that there is an unequal distribution of flow thru the zeolite bed.

To overcome such uneven distribution, it is customary to provide a receiving chamber of sufficient size that will materially overcome these difficulties.

From the foregoing, it is obvious that a relatively large receiving chamber is to be desired if the force of the incoming water is to be considered alone. However, an increase in the size of the receiving chamber necessitates an increase in volume of displacing fluid to flush out this chamber during the period of the regenerating cycle and therefore from this standpoint the opposite or a relatively small chamber is desired.

To overcome these difficulties, I provide means for directing the flow of a fluid thru fixed paths within the container consisting of a series of baffle plates serving to deaden or destroy the force of the incoming fluid within a space of minimum volume, causing an even distribution of flow upwardly thru the zeolite bed to a point of use or to a drain and requiring a minimum amount of water for displacement during the cycle of operation.

Referring to Fig. 1, the container indicated by numeral 3, has within it a bed of zeolite or water softening material 4 of any desired depth, the top of the bed being indicated for the purpose of this specification by the numeral 5.

In the upper end of the container 3, a series of baffle plates consisting of plates 17 and 19 serves to direct the flow of a fluid from the zeolite. Plate 17 has strainer nozzles 18 suitably spaced and equipped with means to permit the passage of a fluid but to retain the zeolite within the container. Plate 19 equipped with perforations 20 serves to assist in directing the flow of fluid from plate 17 to the outlet connection 21.

In the lower end of the container 3, a series of plates consisting of strainer plate 6 and baffle plates 8, 10 and 12 serves to deaden or reduce the force of the incoming waters and direct a uniform flow from the point of inlet thru piping 30 at 14 to the zeolite bed 4. Strainer plate 6 is equipped with strainer nozzles 7, suitably spaced for causing uniform distribution of the fluid passing therefrom. Baffle plates 8, 10 and 12 are equipped with openings or perforations 9, 11 and 13 respectively arranged for distributing the flow in the following manner.

Assume a fluid as passing into the container 3, thru the piping 30, the flow being downwardly towards the lower end of the container. If no means such as baffle plates 8, 10 and 12 were disposed in the path of flow, the incoming fluid would strike the lower end of the container and cause a churning of the fluid in this lower chamber before passing thru the strainer plate nozzles to the zeolite requiring an excessive volume of fluid for displacement purposes.

With such means as there baffle plates 8, 10 and 12 the fluid likewise flows into the container 3 thru the pipe 30 and discharges from the opening 14, downwardly toward the lower end of the container.

In Figure 1, it will be noted that the central opening 16 of plate 10 is shown as being somewhat smaller in diameter than the opening 14 and the central opening 15 in plate 12 as being somewhat smaller in diameter than the opening 16 in plate 10 or considerably smaller in diameter than the opening 14.

By causing a fluid to pass thru pipe 30, the flow, when leaving at 14, will take divided paths, part passing directly thru the openings 15 and 16, striking the lower end of the container and thence upwardly thru the openings 13, a portion passing from the opening 16 between the plates 10 and 12 over toward the openings 13 combining with the flow passing thru openings 13 whence the flow is upward thru openings 11 of plate 10. The balance of inlet flow thru opening 14 passes over towards openings 11 of plate 10 where the combined flows pass upwardly thru the openings 9 in the next plate 8, thence thru the strainer nozzles 8 upwardly thru the zeolite bed.

In a study of Fig. 1, it will be noted the baffle plates provide a means whereby the force or kinetic energy of the incoming water is gradually dissipated by reducing the velocity of the flow first thru a series of openings in the central part of the baffle plates, and then thru another series of openings in the same plates which openings increase in number in each succeeding plate until the flow finally passing to the strainer plate 6 is at a reduced velocity and uniform distribution which is most practical for efficient and uniform distribution by the strainer plate 6.

It will also be noted that the discharge opening 14 is positioned above plate 10 as I have found such arrangement of inlet discharge provides a most effective means for an initial breaking up of the flow or kinetic energy by using these plates in this two-fold manner described and further results in the use of a fewer number of plates, lesser area or space beneath the strainer plate 6 and therefore a lesser volume of displacing fluid will be required in the cycle of operation of a softener.

Again referring to Fig. 1, imbedded in the zeolite bed 4 and disposed in the path of flow of a fluid, provision is made for confining the flow from the strainer plate 6 to the upper plate 17 to fixed or definite paths.

This provision consists of a series of plates 22 secured together in some suitable manner as indicated at 23, positioned within the container 3 as shown in Fig. 1 and then secured to the outer wall of the container in a manner as suggested at numeral 24. This position of plates 22 provides compartments 32 between the upper and lower ends of plates 22 and upper and lower end plates 17 and 6 respectively for purpose of maintaining a uniform depth of zeolite bed in each of the various compartments 32, each compartment being the space between the plates 22 and the shell of container 3 for the length of the plates 22.

Without such means of controlling or directing the flow of a fluid thru a container, there is a marked tendency for a displacing fluid to inter-mingle or churn with the fluid being displaced in a manner which retards the displacing action, this being particularly true and aggravated in instances where a brine solution is being displaced or where such displacements take place in containers of large proportions.

Such difficulties are overcome by the provision of means herein described which permit the sectional area of a container to be sub-divided so that each divisional area is of a size which in normal practice or use has been found to permit a fluid to pass therethru with a minimum amount of inter-mingling or churning. This subdivision of the area provides means for flushing a fluid from a container with a minimum loss of flushing fluid due to delayed displacements.

Leading from the top of container 3, a connection 21 directs the flow of a fluid to the T 26 from whence the flow can be directed either to a point of use at 28 thru pipe 29 controlled by valve 27 or to a drain at 31 thru pipe 33 controlled by valve 34.

Leading from a suitable source of supply at 35, hard or untreated water can be directed thru piping 37, controlled by valve 36, to the T connection 38, check valve 39 and thence into the container 3 thru pipe 30.

In like manner, a regenerating material can be directed into the container 3 from a brine tank or source of supply at 40 (not shown) thru pipe 42, controlled by valve 41, to the T connection 38, check valve 39 and pipe 30.

The cycle of operation is as follows:—

Assuming that the zeolite has become exhausted, and it is desired to apply the regenerating material to the zeolite, the positions of the valves 36 and 27 are changed from the open to the closed positions and valves 41 and 34 from the closed to open positions.

When the valves are so positioned, regenerating material will flow from the brine tank or source of supply at 40 (not shown) thru the open valve 41, pipe 42, T connection 38, check valve 39, inlet pipe 30, outlet opening 14, thence taking divided paths, part passing directly thru the openings 16 and 15 to the space beneath plate 12 and upward thru openings 13, another part passing to the space between plates 10 and 12 where it combines with the fluid passing upwardly thru the opening 13 which combined fluids pass upwardly thru the openings 11 of the plate 10, and the balance passing from the opening 14 to the space between the plates 8 and 10 where it combines with the fluid passing upwardly thru the opening 11 of plate 10. These combined fluids pass upwardly thru the openings 9 of plate 8, thence thru the strainer nozzles 7, zeolite bed 4, compartment 32, freeboard space 25, strainer nozzles 18, openings 20 of plate 19, pipe connection 21, T 26, piping 33, open valve 34 to a drain outlet at 31.

After a sufficient charge of regenerating solution has been introduced into the container 3, determined by any suitable means, the operation of regeneration is completed by closing valve 41 and then the period of flushout initiated by the opening of valve 36, with valves 34 and 27 remaining open and closed respectively as in the period of regeneration.

Having the valves so positioned, water from a source of supply at 35 passes thru open valve 36, piping 37, T connection 38 and thence thru the same course as taken by the regenerating fluid to the drain at 31.

On completion of the flushout operation, determined by a suitable means such as a soap test, the flushing to the drain is terminated by closing valve 34 and the softening operation initiated by the opening of valve 27, valves 36 and 41 remaining in the open and closed positions respectively as during the period of flushout.

During the period of softening, water passes from the source of supply at 35 to the T connection 26 thru the same paths as taken by the flushout water and thence to a point of use at 28 thru piping 29 and the open valve 27.

By describing and illustrating herein what I consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art will be able to take advantage of the principles involved in the disclosure by apparatus, use and methods of procedure perhaps dissimilar in appearance and arrangement but nevertheless within the scope of the invention and therefore desire to comprehend within my invention such modifications as may be necessary to adapt it to varying conditions and uses.

I claim:

1. An apparatus for softening water comprising a tank adapted to contain a softening material and having inlet and outlet connections and a means within the tank for controlling the flow of fluids from the inlet connection to the softening material, said means consisting of a series of baffle plates adjacent the discharge of the inlet connection in the tank and provided with openings in the path of flow towards the bottom of the tank which decrease in area in each succeeding plate and provided with openings in the path of flow from the bottom of the tank towards the water softening material which increase in area in each succeeding plate.

2. An apparatus for softening water comprising a tank adapted to contain a softening material and having inlet and outlet connections and a means within the tank for controlling the flow of a fluid thru the softening material, said means consisting of means for distributing the flow of water to the receiving end of the bed, a plurality of plates embedded in the softening material and arranged to divide the cross-sectional area of the tank into a plurality of smaller areas in a manner whereby the flow of a fluid is from an inlet connection by a multiplicity of paths thru the softening material and then from the water softening material to a common outlet connection.

3. An apparatus for softening water comprising a tank adapted to contain softening material and having inlet and outlet connections and a means within the tank for controlling the flow of fluids from the inlet connection to the outlet connection, said means consisting of a series of baffle plates adjacent the discharge of the inlet connection into the tank provided with openings whereby the kinetic energy of the incoming fluids is dissipated thru openings in said baffle plates before passage to the softening material, and a plurality of plates embedded in the softening material so arranged as to divide the cross-sectional area of the tank into a plurality of smaller areas in a manner whereby the flow of fluid is parallel with the flat sides of said plates in passage to the outlet connection.

4. A water softener comprising a container for a bed of water-softening material, inlet and outlet connections one above and one below the bed, strainer diaphragms above and below the bed, baffle plates having relatively staggered openings through which the water must pass to the bed, and partitions vertically subdividing the bed.

In testimony whereof I have hereunto set my hand this 22 day of Aug. 1929, at Pittsburgh, Pa.

ANDREW J. DOTTERWEICH.